United States Patent [19]

Patrin

[11] 4,188,689
[45] Feb. 19, 1980

[54] TIE BINDER

[76] Inventor: Raymond A. Patrin, GPO Box 731, New York, N.Y. 10001

[21] Appl. No.: 788,544

[22] Filed: Apr. 18, 1977

[51] Int. Cl.² ...................... A44B 17/00; F16B 19/00
[52] U.S. Cl. .................................. 24/221 R; 85/5 R
[58] Field of Search ............. 85/5 P, 9 R; 24/221 R, 24/221 A, 221 K, 221 L, 221 RC

[56] References Cited

U.S. PATENT DOCUMENTS

| | | | |
|---|---|---|---|
| 976,057 | 11/1910 | Esty | 24/221 R |
| 2,334,188 | 11/1943 | Gazley | 24/221 A |
| 2,334,352 | 11/1943 | Purinton | 24/221 A |
| 2,610,378 | 9/1952 | Powell | 24/221 A |
| 2,684,515 | 7/1954 | Zahodiakin | 24/221 A |
| 3,179,367 | 4/1965 | Rapata | 248/239 |

FOREIGN PATENT DOCUMENTS

| | | | |
|---|---|---|---|
| 588886 | 6/1947 | United Kingdom | 24/221 R |
| 829128 | 2/1960 | United Kingdom | 24/221 R |

*Primary Examiner*—Ramon S. Britts

[57] ABSTRACT

A tie binder with a rotatable head is attached by a shank to a spiral edge wedge which may have a frustrum conical roller mounted in an upper edge of the wedge to secure the tie binder to a work piece, a lock washer is secured permanently around the shank and a flat washer may be secured to another side of the work piece in which case the tie binder can engage the flat washer to secure the work pieces together. The flat washers can have turn stops to stop the rotation of the spiral edge wedge and grease and oil holes can be formed in the frustrum conical rollers to permit lubrication.

2 Claims, 18 Drawing Figures

U.S. Patent Feb. 19, 1980 Sheet 1 of 2 4,188,689
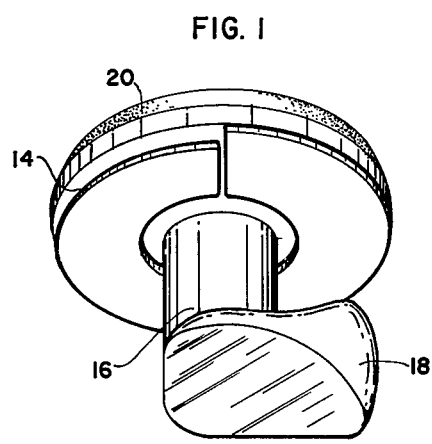
FIG. 1
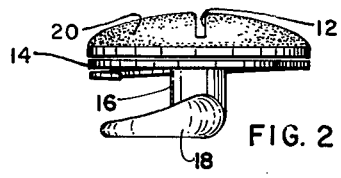
FIG. 2
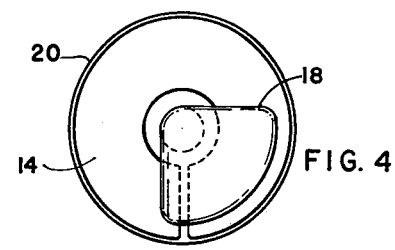
FIG. 4
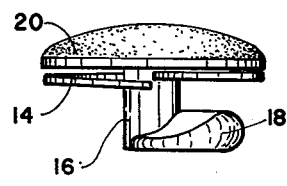
FIG. 3
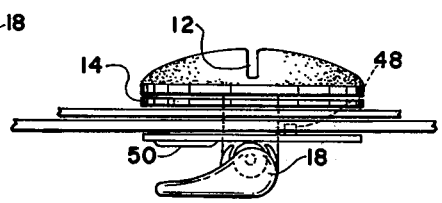
FIG. 5
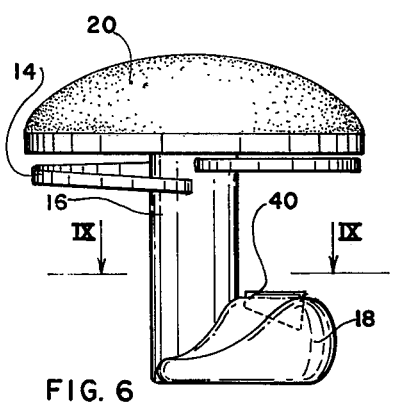
FIG. 6
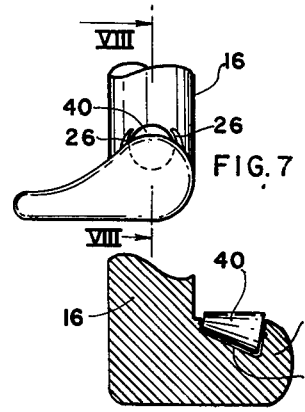
FIG. 7
FIG. 8
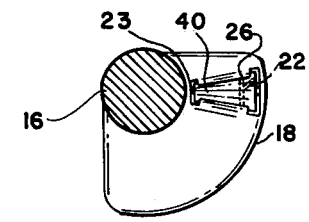
FIG. 9
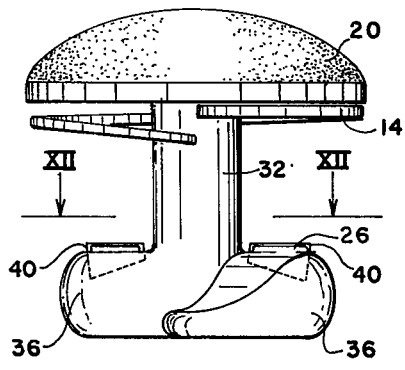
FIG. 10
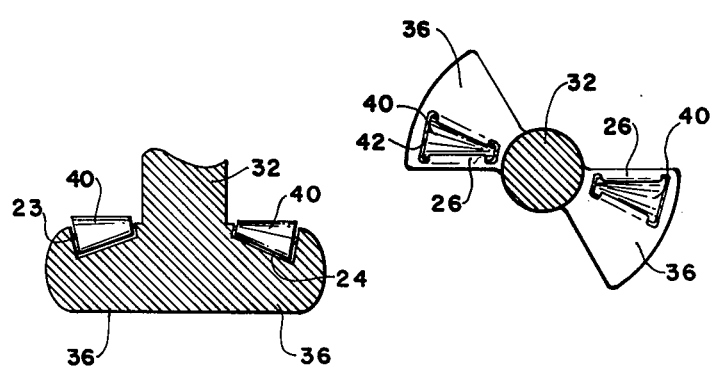
FIG. 11
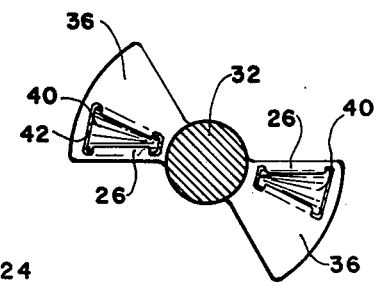
FIG. 12

TIE BINDER

I have invented a new and novel tie binder. My new and novel tie binder may be used to replace screw and bolt constructions for major manufacturers and may be of particular value in such industries as the prefabricated parts industry, including the utilizers of plastics and synthetics and non synthetic materials, such as the toy industry. Other industries able to utilize this tie binder include themetal structure and building construction industry, especially for the formation of scaffoldings; the heavy machinery industry; the light machinery industry; the marine vessel and equipment industry these including ship yards and dry docks; the aerospace and aviation industry; the automotive industry; the wood working carpentry and house construction industry; and various and sundry laboratories and workshops.

The tie binder can be considered to be an improvement in fastening and clasping devices and can be used to hold together work pieces or parts by the simple means of a twist motion. Using predetermined openings in the parts to be assembled the spiral edge wedge can hold the work pieces together firmly. Furthermore, the tie binder can be used both in permanent and temporary binding operations. The tie binder can replace rivets, screws, nuts and bolts, and to replace nut lock washer and bolt combination. Still further, it is to be noted that the tie binder is easy to use is compact is convenient and can be a time saving device. Furthermore, it is to be noted that the lock washer used in this device is an intrinsic part of the construction of the tie binder attached to the tie binder per se at the factory at the time of manufacture and fitting loosely around the shank of the tie binder as would be in a standard bolt and lock washer and nut combination but without the difficulty of the lock washer becoming separated from the bolt. A novel flat washer can be used in conjunction with the tie binder for securing the tie binder to the work pieces in a manner similar to the use of the nut in the nut and bolt fastening art. Still further, it is to be noted that the tie binder can be made with a single spiral edge wedge and can be made in dual spring edge wedge configuration.

My invention can be understood in view of the accompanying figures.

FIG. 1 is a perspective view of a first embodiment of the tie binder.

FIG. 2 is a side view of the tie binder of FIG. 1.

FIG. 3 is a second side view at a slightly different angle of the tie binder of FIG. 1.

FIG. 4 is a bottom view looking up at the tie binder of FIG. 1.

FIG. 5 is a side view in partial section of the tie binder of FIG. 1 attached to a work piece.

FIG. 6 is a side view of the tie binder of FIG. 1 with a roller mounted in the wedge of the tie binder.

FIG. 7 is a close up side view of the wedge of FIG. 6.

FIG. 8 is a cross sectional side view of the portion of the tie binder seen in FIG. 7 taken along the plane 8—8 of FIG. 7.

FIG. 9 is a view of the tie binder of FIG. 6 taken along the plane 9—9 of FIG. 6.

FIG. 10 is a side view of the second embodiment of the tie binder.

FIG. 11 is a cross sectional view through the opposing wedges of the tie binder of FIG. 10.

FIG. 12 is a section taken along the plane 12—12 of FIG. 10.

Figure 13:
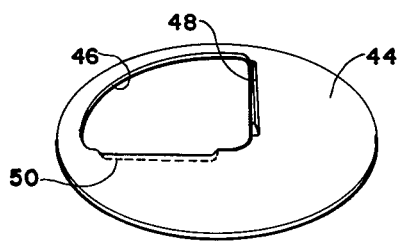
FIG. 13 is a perspective view of one embodiment of the flat washer.

With regard to FIGS. 1, 2, 3, 4, 5, 6, 7, 8, and 9, a tie binder head 20 is seen to have a kerf for receiving a screw driver head in order to rotate the head 20. A permanently attached lock washer 14 is seen mounted around the shank 16 which is attached to the bottom of the head 20. At the bottom of the shank 16 a spiral edge wedge 18 is attached. A frustrum conical roller 40 can be mounted in the top of the spiral edge wedge 18. Grooved grease and oil channels 22 can be formed in the frustrum conical rollers 40 and the rollers 40 can roll securely inside grooved recesses 24 in the top of the spiral edge wedge 18. Groove apexes in recess 24 on which frustrum conical rollers 40 rest and roll to be of smooth slippery finish. Alternatively lips 26 can close in over the edges of the grooved recess 24 to secure the frustrum conical rollers 40 allowing them freedom to roll within recess 24 of spiral edge wedge 18. Pivots 23 can be used to support the frustrum conical rollers 40 and can be of a diameter up to that of the edge of the roller 40.

With regard to FIGS. 10, 11, and 12, the head 20 is seen above the lock washer 14 which is attached to the shank 32 to which a pair of oppositely attached spiral edge wedges 36 are a attached at the bottom of the shank 32. Frustrum conical rollers 40 embedded within grooved recesses 24 can roll freely in the top of each of the spiral edge wedges 36.

Figure 14:
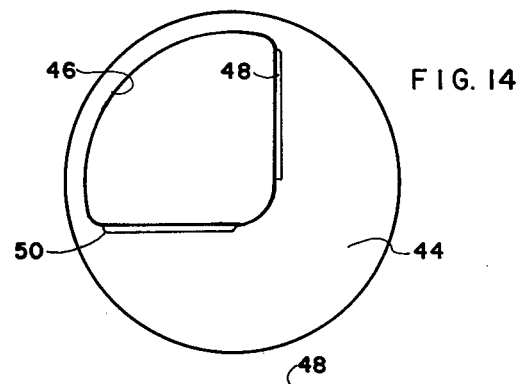
FIG. 14 is a top view of the flat washer of FIG. 13.
Figure 15:
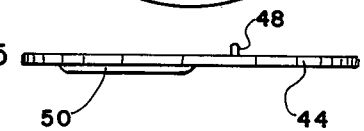
FIG. 15 is a side view of the flat washer of FIG. 13.

With regard to FIGS. 13, 14, and 15, the flat washer 44 forms a sectorial shaped aperture 46 through which the spiral edge wedge 18 may pass and the radial edges of the aperture 46 form opposed knockout type turn stops 48 and 50 to engage the frustrum conical roller 40, and/or inhibit washer turning.

Figure 16:
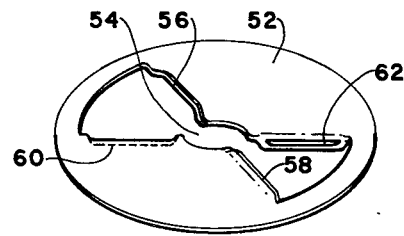
FIG. 16 is a perspective view of a second embodiment of the flat washer, applicable with the dual tie binder.
Figure 17:
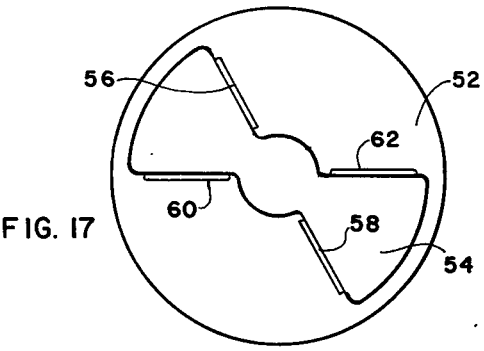
FIG. 17 is a top view of the flat washer of FIG. 16.
Figure 18:
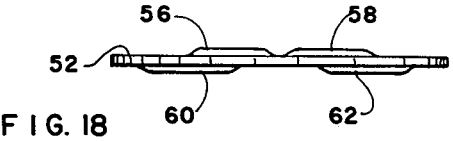
FIG. 18 is a side view of the flat washer of FIG. 16.

With regard to FIGS. 16, 17, and 18, the alternate embodiment of the flat washer 52 forms a double sectorial shaped aperture 54 in the general shape of a FIG. 8 on the edges of which knockout type turn stops 56, 58, 60 and 62 are formed to engage the frustrum conical rollers 40 of the opposed spiral edge wedges 36 of the tie binder 20 after the tie binder 20 has been inserted through pieces intended for binding, and/or inhibit washer turning.

A few further features are to be noted concerning the tie binder, for example the head such as 20 may be of hexagonal shape if desired. In addition, the frustrum conical roller such as 40 should be mounted within the grooved recess 24 in top of the spiral edge wedge such as 18 with approximately ⅓ of its total surface exposed for rolling contact with a flat washer such as 44, and with long axis rolling side of roller 40 alligned parallel to head base for maximum contact with flat washer such as 44, and maximum efficiency. The turn stops such as 48 as intended to prevent the washer such as 44 from turning when properly installed over a hole through which the tie binder such as is illustrated in FIG. 5 has been inserted and has been engaged with the flat washer 44. It is to be noted that the flat washers 44 can be inverted without altering their effectiveness. The double sectorial shaped apertured flat washer 52 can function in the same manner.

Having described a preferred embodiment of my invention, it is understood that various changes can be made without departing from the spirit of my invention, and, I desire to cover by the appended claims all such modifications as fall within the true spirit and scope of my invention.

What I claim and seek to secure by Letters Patent is:

1. A tie binder, comprising:
   a head,
   a shank attached to a bottom of the head,
   a spiral engaging means attached to a bottom of the shank, whereby the head may be engaged to and secured to work pieces for binding,
   a lock washer captively carried on the shank of the tie binder,
   the spiral engaging means defining a spiral wedge surface attached to the bottom of the shank,
   a frustrum conical roller rotatably mounted within recess means at the uppermost portion of the spiral wedge surface, and
   the frustrum conical roller including grease and oil holes therethrough, whereby grease and oil may be secured within and on the frustrum conical roller.

2. The tie binder of claim 1, wherein the spiral engaging means comprises a pair of said spiral wedge surfaces being disposed in diametrical relationship to each other.

* * * * *